J. D. SMEDLEY.
Oil Still.
No. 37,709. Patented Feb. 17, 1863.
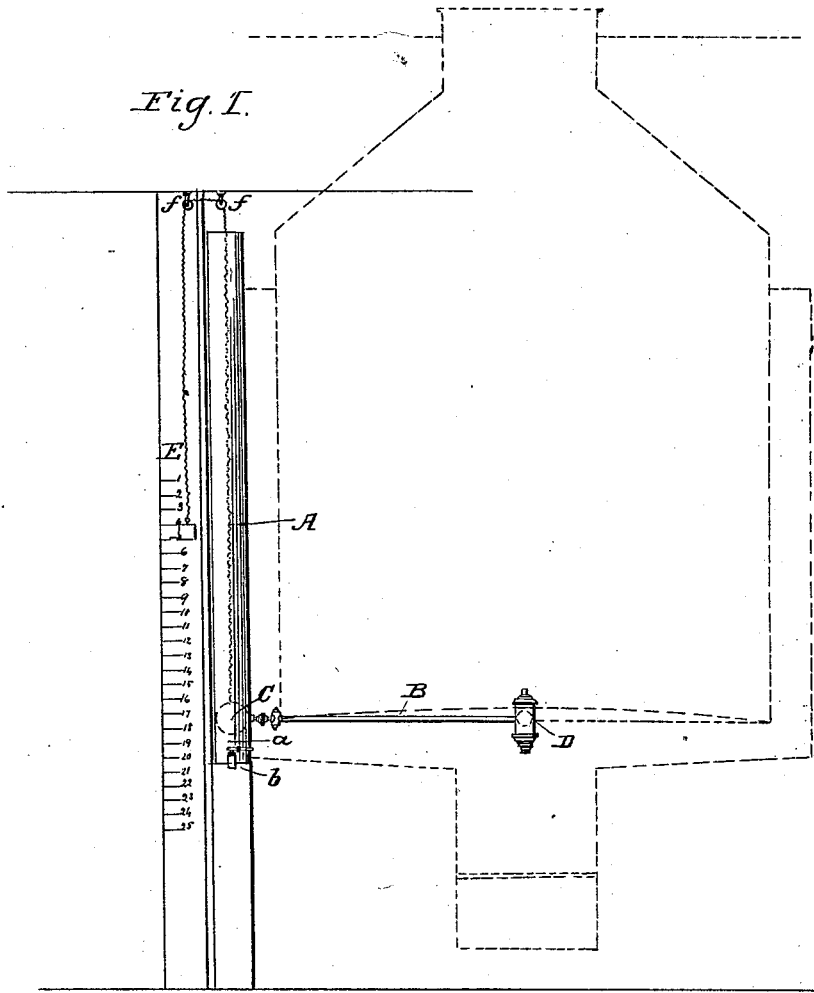
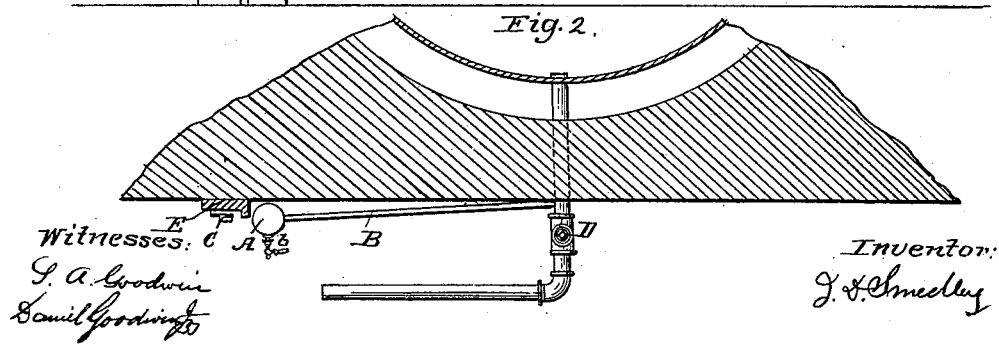

UNITED STATES PATENT OFFICE.

JOHN D. SMEDLEY, OF CHICAGO, ILLINOIS.

IMPROVEMENT IN OIL-STILLS.

Specification forming part of Letters Patent No. 37,709, dated February 17, 1863.

*To all whom it may concern:*

Be it known that I, JOHN D. SMEDLEY, of Chicago, in the county of Cook and State of Illinois, have invented a new and useful apparatus for indicating the amount of liquid in a carbon or coal oil still, and for separating the water from the oil in such still, called "an indicator and separator for carbon or coal oil stills;" and I do hereby declare that the following is a full and exact description of the construction and operation of the same, reference being had to the annexed drawings, making a part of this specification, in which—

Figure 1 is a perspective view, and Fig. 2 is a transverse section.

The apparatus consists of a small horizontal tube, B, tapping the still at the bottom, together with the large perpendicular pipe A, which is entered by the tube B some distance above its lower end. The lower end of the pipe A, extending below the bottom of the still, forms the chamber $a$, and is provided with a cock, $b$, by which the water may be drawn from the chamber $a$. The pipe A may be of glass or metal. I prefer metal, as least liable to become broken or injured. In case metal is used, I employ the float C, to which is attached the weight $c$ by a cord passing over the pulleys $f\ f$ to the scale E.

The operation of the apparatus is as follows: As the still is filled the fluid passing through the tube B finds its level in the pipe A, through which, if of glass, its height may be observed. If the pipe A is of metal, the float C rises upon the surface of the liquid, indicating the quantity by the position of the weight $c$ upon the scale E. As the oil is distilled off the decrease in quantity is indicated in the same manner. The water, which naturally flows to the bottom of the oil, collects in the chamber $a$ as the lowest point, and is from thence drawn off by the cock $b$ as often as necessary. The tube B should be very small, and the pipe A several times larger in diameter than the tube B. I make the tube B one-half of an inch in diameter and the pipe A six inches in diameter, though this exact proportion is not necessary. The pipe A should be placed not less than two or three feet from the still. By employing the small tube B in connection with a large pipe, A, placed at a distance from the still, the liquid in the pipe A is prevented from boiling and kept constantly cool, and is not affected by the foaming or agitation of the liquid in the still, but always correctly indicates the quantity in the still.

I do not claim the use of a bent tube or pipe to indicate the level of the fluid in the still, as I am aware that this has been used for ascertaining the level of fluids in other cases; but

I claim—

1. The use of the large pipe A in combination with a small horizontal connecting-tube, B, in any way, substantially as described, by means of which the fluid in the pipe, being kept constantly cool and free from agitation from the still, the quantity of liquid in the still is always correctly indicated.

2. The extension of the pipe A below the bottom of the still, forming a chamber, $a$, by means of which the water is separated from the oil and can be drawn off.

J. D. SMEDLEY.

Witnesses:
　J. WOODBRIDGE SMITH,
　S. A. GOODWIN.